Aug. 21, 1951 O. SCHURENBERG 2,565,326
AUTOMATIC MACHINE FOR CLEANING WATCH PARTS
Filed May 23, 1946 3 Sheets-Sheet 1

INVENTOR.
OTTO SCHURENBERG
BY
ATTORNEY

Aug. 21, 1951     O. SCHURENBERG     2,565,326
AUTOMATIC MACHINE FOR CLEANING WATCH PARTS
Filed May 23, 1946     3 Sheets-Sheet 3

INVENTOR.
Otto Schurenberg
BY
ATTORNEY

Patented Aug. 21, 1951

2,565,326

UNITED STATES PATENT OFFICE 2,565,326

AUTOMATIC MACHINE FOR CLEANING WATCH PARTS

Otto Schurenberg, New York, N. Y.

Application May 23, 1946, Serial No. 671,756

10 Claims. (Cl. 134—57)

This invention relates to an automatic machine for cleaning watch parts.

A particular object of the invention is to provide a compact mechanism that is fully automatic in operation and in which the parts of a watch to be cleaned may be contained in a basket and may be automatically advanced from station to station to be dipped and whirled first in a container of cleaning fluid, then in a container of rinsing solution, then in a container of drying solution, then positioned in a drying container and finally brought to starting position where the contents of the basket can be removed and other parts to be cleaned inserted.

Further objects of the invention include the provision of means for timing the operations by the use of an automatic timing switch which controls the whirling time of the container basket; to provide a leverage structure which will raise and lower the positioning disc intermittently in its movements from station to station so that the cleaning basket will be rotated exactly the right amount at each step; and to provide a machine of the character referred to which, after starting each cycle of operation operates automatically and without further attention on the part of the operator.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Figure 1:
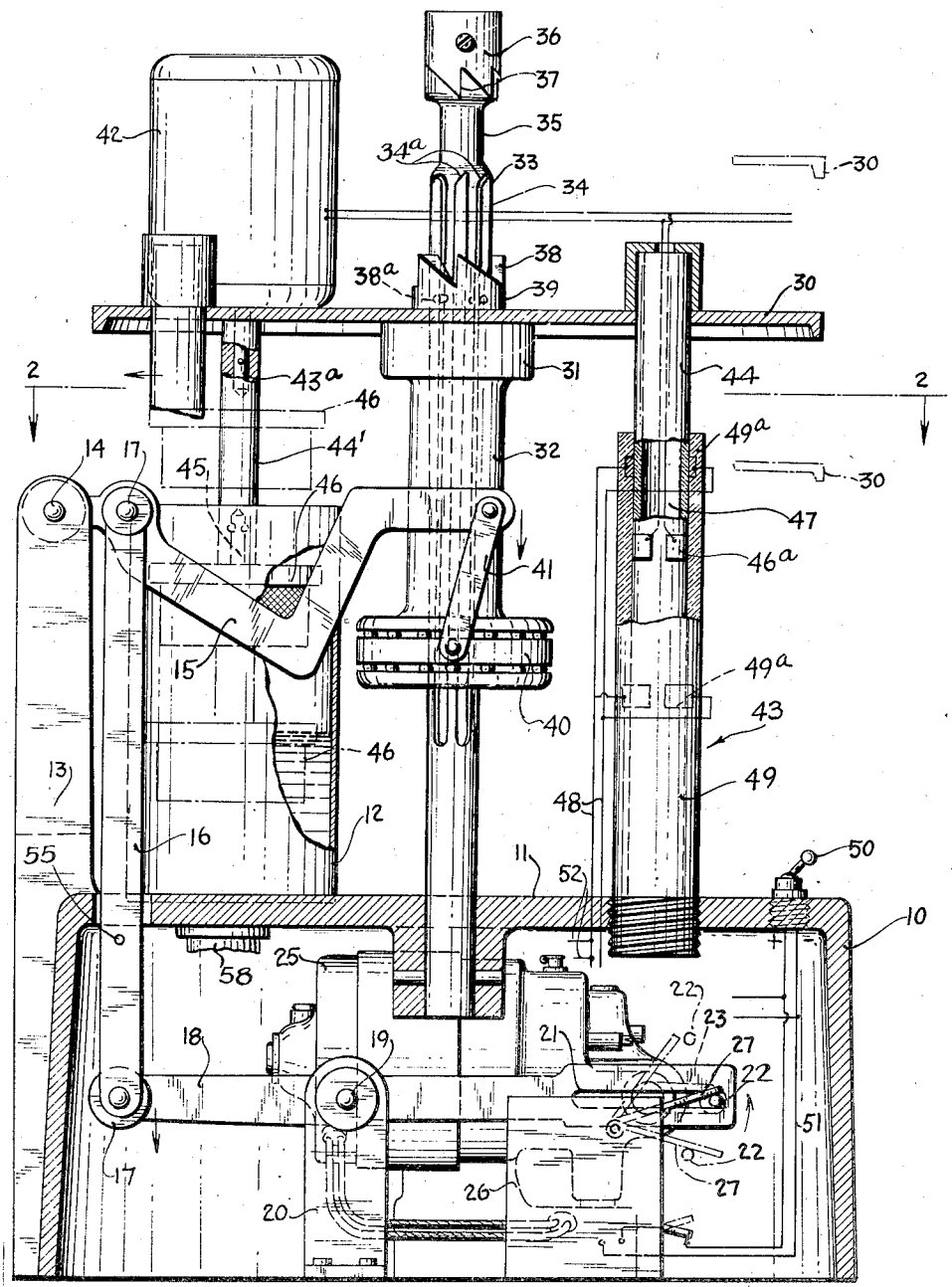
Fig. 1 is a view in sectional elevation taken through the machine and illustrating the relative location of the parts and operation thereof, and having certain parts broken away for clearness of illustration.

Referring to the drawings in detail 10 indicates a base, the top 11 of which constitutes a support for a number of containers 12 positioned concentrically thereon and constituting four of the stations at which the cleaning and drying is performed. The base 10 at one side is provided with a bracket 13 in which is pivoted as at 14 a lift arm 15, the same being moved vertically by the vertical reciprocations of a link 16 pivoted as at 17 to a lever 18 which is mounted for rocking motion on a pintle 19 supported in a bracket 20 within the hollow base 10. The free end of the lever 18 is formed with a slot 21 engaged by a pin block 21ª carrying a pin 22 which extends from and rotates with a crank arm 23 mounted on the end of a driven shaft 24 extending from the motor casing 25.

The operation of the motor is controlled through the medium of a timing device 26 suitably positioned in the bottom of the base 10 and arranged to be set by operation of a handle 27 offset at its outer extremity to overlie the pin 22. As is well understood in these timing devices, upward movement of the handle 27 will start the timing mechanism in operation which will continue for a predetermined length of time after which the handle will be released and snap down. As the arm 23 and handle 27 turn on centers which are out of alignment, upward motion of the pin 22 will cause the handle 27 to be moved vertically until the pin 22 rides from beneath the end of the handle 27, as shown by the upper dot and dash lines in Fig. 1, freeing the handle 27 to be moved downwards by the usual resilient means within the timing device 26. The pin 22 will continue its rotation carrying the arm 18 to complete the reciprocation of the arm 18. As the pin 22 again approaches the handle 27 the period of time for which the timing device 26 has been set will have elapsed and current to the motor 25 will be shut off. After the elapse of a given time, the timing device 26 will again close the circuit and energize the motor 25 and repeat the operation. In this instance, the interval of time measured will be equal to one rotation of the crank arm 23 which will cause one complete up and down movement of the arm 15 to raise and lower the carrier plate or turntable disc 30. The latter is mounted above the base 10 and is suitably secured in any manner to the flanged portion 31 of a sleeve 32 which is arranged to have sliding engagement vertically of a fixed post 33 which is fluted as at 34 and provided with a reduced neck 35 between the top ends of the flutes 34 and the bottom ends of five downwardly extending ratchet teeth 37 formed on the bottom portion of the end portion 36. The top ends of the flutes 34 open into the reduced neck portion 35 of the fixed post 33, and the top ends of the material of the fixed post 33 between the adjacent flutes 34 are formed with downwardly slanted cam surfaces 34ª. The portion 39 of the sleeve 32 which extends above the top face of the plate 30, has its top edge formed with five spaced ratchet teeth 39 corresponding to the ratchet teeth 38. The projecting portion 39 of the sleeve 32 also carries radially inwardly projecting pins 38ª which extend into the flutes 34 and hold the sleeve 32 and the disc 30 carried thereby against rotation on the fixed post 33. The pins 38ª are free to move along the length of the flutes 34 permitting the sleeve 32 and disc 30 to be raised and lowered on the fixed post 33.

As the sleeve 32 and disc 30 are raised vertically on the fixed post 33, by upward pivoting of the lift arm 15, and just as the ratchet teeth 38 are about to engage the ratchet teeth 37, the pins 38ᵃ move out of the top ends of the flutes 34 into alignment with the reduced neck portion 35 to free the sleeve 32 and disc 30 for rotational movement relative to the fixed post 33. Further upward movement of the sleeve 32 and disc 30 will engage the teeth 38 into the teeth 37 and cause the sleeve 32 and the disc 30 to be turned through the major portion of one-fifth of a revolution—one fifth of a revolution being the distance the sleeve 32 and the disc 30 must be moved to move the basket 46, to be described hereinafter, from axial alignment with one container into axial alignment with the next adjacent container.

The lift arm 15 then pivots downward moving the sleeve 32 and the disc 30 downward to reengage the pins 38ᵃ into the flutes 34. However, before such reengagement takes place, the pins 38ᵃ engage and ride over the cam surfaces 34ᵃ to turn the sleeve 32 and disc 30 through the remaining portion of that one-fifth revolution to complete the axial alignment of the basket 46 with the next adjacent container. The rotation through that remaining portion of that one-fifth revolution also moves the ratchet teeth 37 and 38 out of alignment thus reconditioning those teeth for rotational interengagement on the next upward movement of the sleeve 32 and disc 30.

The end portion 36 has its lower edge formed with five spaced ratchet teeth 37. Likewise, a portion 39 of the sleeve 32 which extends above the top face of the plate 30, has its top edge formed with five spaced ratchet teeth 38. The projecting portion 39 also carries radially inwardly projecting pins 38ᵃ which engage the flutes 34 of the fixed post 33 and hold the sleeve 32 and the disc 30 carried thereby against rotation on the post 33. The pins 38ᵃ are free to move along the length of the flutes 34 allowing the sleeve 32 and the disc 30 to be moved axially of the post 33. When the sleeve 32 is raised vertically on the fixed post 33, which will become clear as this description proceeds, the pins 38ᵃ will ride out of the top ends of the flutes 34 and become aligned with the reduced neck 35 of the fixed post 33, freeing the sleeve 32 and the plate 30 to be rotated. Simultaneously, the teeth 38 of the projecting portion 39 of the sleeve 32 will engage the teeth 37 on the end 36 of the fixed post 33 and the inclined surfaces of the teeth 37 and 38 will cause the sleeve 32 and the plate 30 carried thereby, to make one-fifth of a complete revolution or be turned through 72 degrees.

Figure 2:
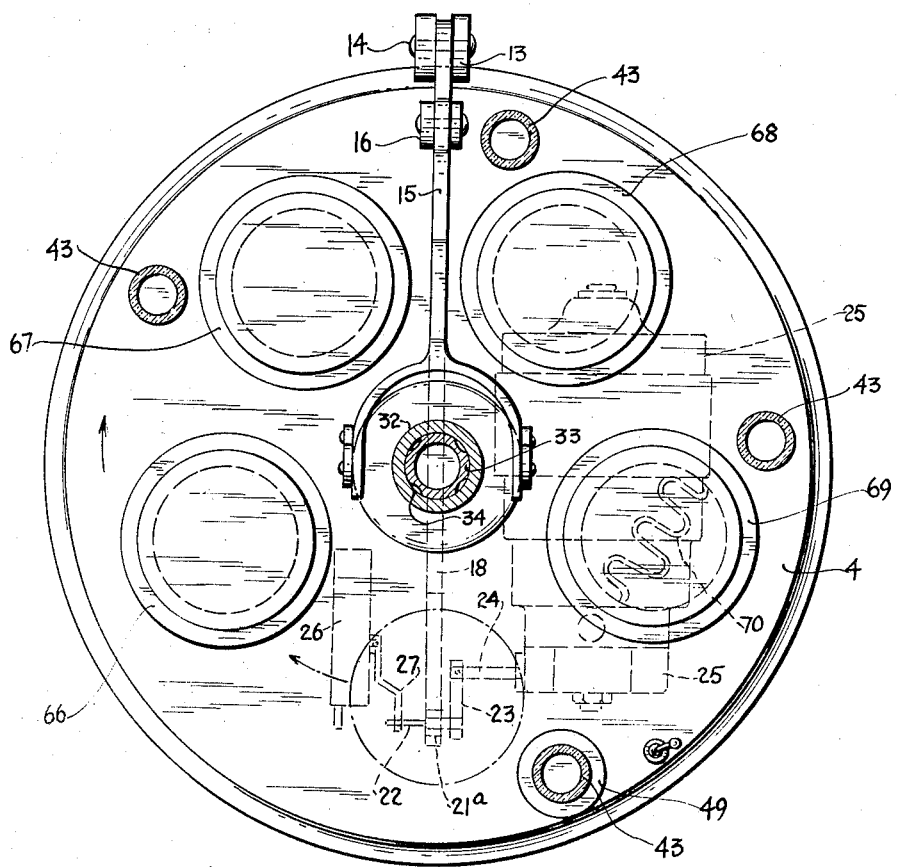
Fig. 2 is a section on the line 2—2 of Fig. 1 showing the relative arrangement of the containers and the actuating parts of the mechanism.

The lower end of the sleeve 32 is provided with a thrust bearing 40 having a portion secured to the sleeve 32 and a rotative portion. The rotative portion is secured to the end of the arm 15 through the medium of links 41. The inner end of the arm 15 is bifurcated, see Fig. 2, and the portions of the bifurcated end extend along opposite sides of the fixed post 33. The links 41 extend substantially vertically and have their upper ends pivotally attached to the free ends of the portions of the bifurcated end of the arm 15. The lower ends of the links 41 are pivotally attached to the sides of the rotative portion of the bearing 40 to cause the sleeve 32 and plate 30 to be reciprocated vertically on the fixed post 33, for the purpose hereinbefore described, as the arm 15 pivots up and down. The table 30 carries a motor 42 whose depending shaft 43ᵃ has attached thereto a sleeve 44' in which may be detachably held a grooved pin 45 for supporting a wicker wire basket 46 in which the pieces of a watch, to be cleaned, are carried.

Operation of the motor 42 is caused at the upper and intermediate vertical positions of the turntable 30 by a control member 43 which consists of a tubular member 44 depending from the underside of the table 30 and provided on its outer surface with semi-circular contact bridging strips 46ᵃ which are connected by wires 47 with the motor 42. The tubular member 44 is successively brought into register with one of four tubular members 49 arranged concentrically about the post 33 and threaded in base 10. Each member 49 is provided on its inner wall with vertically spaced sets of peripherally spaced contacts 49ᵃ supplied with current through feed lines 48. The lower pair of contacts 49ᵃ correspond in position to the lower position of table 30, while the upper pair are below the upper position of the table whereby, as the tubular member 44 moves vertically within any one of the members 49, the contacts 46ᵃ carried by the tubular member 44 momentarily wipes the upper contacts 49ᵃ to cause whirling of the basket 46 after it is raised out of the fluid, in which it has also been whirled, but before it leaves the tank 12.

Figure 3:
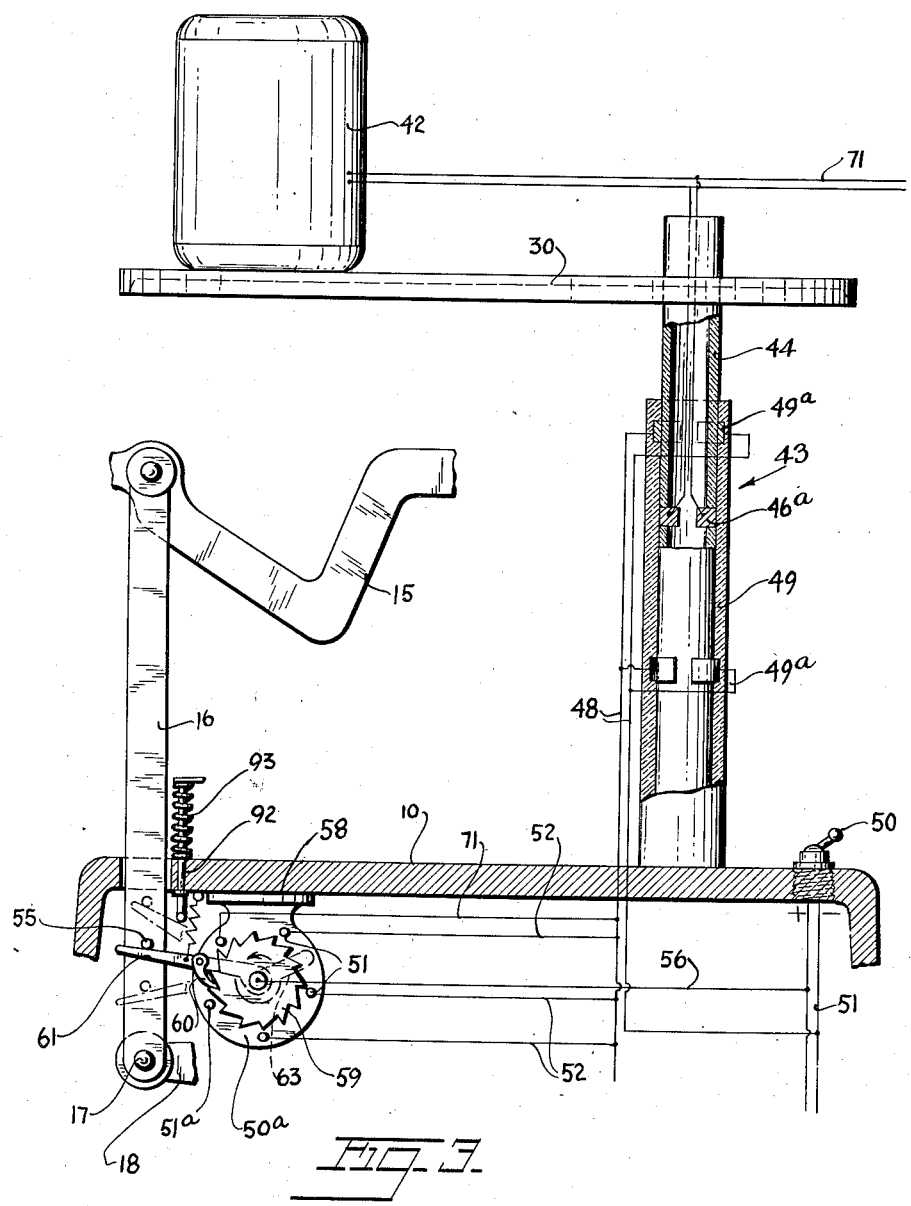
Fig. 3 is a view in fragmentary elevation showing a control means employed in the machine.

In starting the device, use is made of a manually operated main switch 50 in line 51 to control the current to the timing member 26. In the control of the mechanism as illustrated in Fig. 3, it is necessary that the motor 42 be operated at each of the stations, that is, at each of the four places where the parts are bathed and dried and to insure that operation of the motor 42 will occur only at the proper time, I employ a control panel 50ᵃ having five contacts 51 and 51ᵃ thereon, four of which are connected through lines 52 and 48 to the upper and lower contacts 49ᵃ in the tube 49.

The contact carrier 50ᵃ is mounted on the underside of base 10 in a bracket 58 in which is revolvably supported a ratchet wheel 59 arranged to be actuated by a pawl 60 whose ratchet arm 61 is disposed in the path of a pin 55 on link 16. Upon each downward movement of the turntable 30, the ratchet is operated by link 16 and revolves a contact arm 63 into engagement with successive contacts 51, the arm 63 being connected to the plus side of a line 56 from the main switch 50 so that when the switch 50 is turned on, successive operations of the turntable will advance the contact arm 63 in step by step movement to successively engage the contacts 51 and operate the motor 42 at each of the four stations where the work carrier basket 46 is to be rotated. At the last step or fifth downward motion of the turntable no current will flow through the dead contact 51ᵃ. This will result in the work being positioned at the end of the operating cycle which is also the starting position of the cleaning operation, the vats 66, 67 and 68 containing respectively a cleaning fluid, a rinsing fluid and a drying solution. An additional receptacle 69 is employed in which a heating coil is mounted to provide a dryer. The dryer 70 is connected with one of the contacts 51 through the line 71.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. A machine for cleaning watch parts comprising a basket for holding said parts, a motor, means for attaching the basket to the motor, a turntable on which the motor is mounted, a plurality of fluid tanks, said basket being movable into any one of the tanks or raised thereabove, means for revolving the turntable to bring said basket over each tank successively, means for raising and lowering said turntable whereby the basket can be immersed in each tank, electrical circuit means including spaced sets of contacts for controlling the operation of the motor to whirl said basket at different vertical positions thereof, and a contact control member for engagement with and disengagement from said spaced sets of contacts for making and breaking said circuit means to control the operation of said motor.

2. A machine for cleaning watch parts comprising a basket for holding said parts, a motor, means for attaching the basket to the motor, a turntable on which the motor is mounted, a plurality of fluid tanks, said basket being movable into any one of the tanks or raised thereabove, means for revolving the turntable to bring said basket over each tank successively, means for raising and lowering said turntable whereby the basket can be immersed in each tank, means including opposed sets of contacts for controlling the operation of the motor to whirl said basket at different vertical positions thereof, a timing mechanism for controlling the turntable raising and lowering means, and a contact control member for engagement with and disengagement from said spaced sets of contacts for making and breaking circuits to control the operation of said motor.

3. A machine for cleaning watch parts comprising a basket for holding said parts, a motor, means for attaching the basket to the motor, a turntable on which the motor is mounted, a plurality of fluid tanks, said basket being movable into any one of the tanks or raised thereabove, means for revolving the turntable to bring said basket over each tank successively, means for raising and lowering said turntable whereby the basket can be immersed in each tank, means for controlling the operation of the motor to whirl said basket at different vertical positions thereof, a timing mechanism for controlling the turntable raising and lowering means, a contact control member for engagement with and disengagement from said spaced sets of contacts for making and breaking circuits to control the operation of said motor, and means on said turntable raising and lowering means for operating said control member.

4. A machine for cleaning watch parts comprising a base, a post on the base, a turntable supported on said post, a basket motor on the turntable, a basket rotated by said motor and detachably associated with the shaft of the motor, spaced control means on said turntable, said basket and control means depending from the underside of said table, means for intermittently raising and lowering the turntable, circularly spaced tanks beneath the turntable, said basket being movable into any one of said tanks or raised thereabove, means operated by the rising movement of said turntable for rotating the same to bring the basket over each tank in succession whereby it can be lowered into the tank when the table moves down, tubular members on said base arranged to be engaged successively by said control means when the table lowers, and circuit controlling contacts connected in a circuit including said basket motor and associated with the control means and tubular members for being engaged when the control means engages the tubular member to operate the basket motor to whirl the basket at different vertical positions thereof.

5. A machine for cleaning watch parts comprising a base, a post on the base, a turntable supported on said post, a basket motor on the turntable, a basket rotated by said motor and detachably associated with the shaft of the motor, spaced control means on said turntable, said basket and control means depending from the underside of said table, means for intermittently raising and lowering the turntable, circularly spaced tanks beneath the turntable, said basket being movable into any one of said tanks or raised thereabove, means operated by the rising movement of said turntable for rotating the same to bring the basket over each tank in succession whereby it can be lowered into the tank when the table moves down, tubular members on said base arranged to be engaged successively by said control means when the table lowers, circuit controlling contacts connected in a circuit including said basket motor and associated with the control means and tubular members for being engaged when the control means engages the tubular member to operate the basket motor to whirl the basket at different vertical positions thereof, said table raising and lowering means including a motor in the base, a sleeve on said post to which the table is attached, and means operatively connecting said last-mentioned motor and said sleeve for vertically reciprocating the latter.

6. A machine for cleaning watch parts comprising a base, a post on the base, a turntable supported on said post, a basket motor on the turntable, a basket rotated by said motor and detachably associated with the shaft of the motor, spaced control means on said turntable, said basket and control means depending from the underside of said table, means for intermittently raising and lowering the turntable, circularly spaced tanks beneath the turntable, said basket being movable into any one of said tanks or raised thereabove, means operated by the rising movement of said turntable for rotating the same to bring the basket over each tank in succession whereby it can be lowered into the tank when the table moves down, tubular members on said base arranged to be engaged successively by said control means when the table lowers, circuit controlling contacts connected in a circuit including said basket motor and associated with the control means and tubular members for being engaged when the control means engages the tubular member to operate the basket motor to whirl the basket at different vertical positions thereof, said table raising and lowering means including a motor in the base, a sleeve on said post to which the table is attached, a train of parts operatively connecting said last-mentioned motor and said sleeve for vertically reciprocating the latter, said train of parts including a crank pin, a lever linkage thereby, and a timing mechanism for governing the operating time of the base motor arranged to be set by said pin.

7. A machine for cleaning watch parts comprising a base, a post on the base, a turntable supported on said post, a basket motor on the turntable, a basket rotated by said motor and detachably associated with the shaft of the motor, spaced control means on said turntable, said basket and control means depending from the underside of said table, means for intermittently raising and lowering the turntable, circularly spaced tanks beneath the turntable, said basket being movable into any one of said tanks or raised thereabove, means operated by the rising movement of said turntable for rotating the same to bring the basket over each tank in succession whereby it can be lowered into the tank when the table moves down, tubular members on said base arranged to be engaged successively by said control means when the table lowers, circuit controlling contacts connected in a circuit including said basket motor and associated with the control means and tubular members for being engaged when the control means engages the tubular member to operate the basket motor to whirl the basket at different vertical positions thereof, said table raising and lowering means including a motor in the base, a sleeve on the post to which the table is attached, a sleeve reciprocating linkage operatively joining the sleeve and the base motor, a switch for controlling the operation of the base motor, a timing unit arranged to be set by operation of said linkage and a circuit including said unit, the switch and the motor for operating the latter intermittently to raise and lower said table.

8. A machine for cleaning watch parts comprising a base, a post on the base, a turntable supported on said post, a basket motor on the turntable, a basket rotated by said motor and detachably associated with the shaft of the motor, spaced control means on said turntable, said basket and control means depending from the underside of said table, means for intermittently raising and lowering the turntable, circularly spaced tanks beneath the turntable, said basket being movable into any one of said tanks or raised thereabove, means operated by the rising movement of said turntable for rotating the same to bring the basket over each tank in succession whereby it can be lowered into the tank when the table moves down, tubular members on said base arranged to be engaged successively by said control means when the table lowers, circuit controlling contacts carried by said control means and tubular members, said table raising and lowering means including a motor in the base, a sleeve on the post to which the table is attached, a sleeve reciprocating linkage operatively joining the sleeve and the base motor, circuits including said basket motor, said contacts of said tubular members, a main switch and said contacts of said control means, and means controlled by the movement of said linkage for intermittently energizing the circuit through said basket motor whereby the operation of said basket motor occurs at different vertical positions thereof as the contacts of said control means engage the contacts of said tubular members.

9. A machine for cleaning watch parts comprising a base, a post on the base, a turntable supported on said post, a basket motor on the turntable, a basket rotated by said motor and detachably associated with the shaft of the motor, spaced control means on said turntable, said basket and control means depending from the underside of said table, means for intermittently raising and lowering the turntable, circularly spaced tanks beneath the turntable, said basket being movable into any one of said tanks or raised thereabove, means operated by the rising movement of said turntable for rotating the same to bring the basket over each tank in succession whereby it can be lowered into the tank when the table moves down, tubular members on said base arranged to be engaged successively by said control means when the table lowers, circuit controlling contacts carried by said control means and tubular members, said table raising and lowering means including a motor in the base, a sleeve on the post to which the table is attached, a sleeve reciprocating linkage operatively joining the sleeve and the base motor, circuits including said basket motor, said contacts of said tubular members, a main switch and said contacts of said control means, means controlled by the movement of said linkage for intermittently energizing the circuit through said basket motor whereby the operation of said basket motor occurs at different vertical positions thereof as the contacts of said control means engage the contacts of said tubular members, and said circuit controlling contacts being vertically spaced in said tubular member for engagement with a single circuit controlling contact of said control means.

10. A machine for cleaning watch parts comprising a base, a post on the base, a turntable supported on said post, a basket motor on the turntable, a basket rotated by said motor and detachably associated with the shaft of the motor, spaced control means on said turntable, said basket and control means depending from the underside of said table, means for intermittently raising and lowering the turntable, circularly spaced tanks beneath the turntable, said basket being movable into any one of said tanks or raised thereabove, means operated by the rising movement of said turntable for rotating the same to bring the basket over each tank in succession whereby it can be lowered into the tank when the table moves down, tubular members on said base arranged to be engaged successively by said control means when the table lowers, circuit controlling contacts carried by said control means and tubular members, said table raising and lowering means including a motor in the base, a sleeve on the post to which the table is attached, a sleeve reciprocating linkage operatively joining the sleeve and the base motor, circuits including said basket motor, said contacts of said tubular members, a main switch and said contacts of said control means, means controlled by the movement of said linkage for intermittently energizing the circuit through said basket motor whereby the operation of said basket motor occurs at different vertical positions thereof as the contacts of said control means engage the contacts of said tubular members, and manually operated means for operating said linkage controlled means for initiating a cycle of operation of said machine.

OTTO SCHURENBERG.

REFERENCES CITED

The following references are of record in the file of this patent:

UNITED STATES PATENTS

| Number | Name | Date |
|---|---|---|
| 1,453,606 | Sacksteder | May 1, 1923 |
| 1,795,167 | Gross | Mar. 3, 1931 |
| 1,958,846 | Christensen | May 15, 1934 |
| 2,104,456 | Friedman | Jan. 4, 1938 |
| 2,157,875 | Weiskopf | May 9, 1939 |
| 2,177,982 | Hannon | Oct. 31, 1939 |
| 2,184,020 | Repasy | Dec. 19, 1939 |
| 2,510,911 | Schurenberg | June 6, 1950 |